May 13, 1952     H. E. GANTZER     2,596,813
MATERIAL INSERTING MACHINE

Filed April 9, 1947     6 Sheets-Sheet 1

INVENTOR.
Howard E. Gantzer
BY
Thomas E. Tate
Agent

May 13, 1952 H. E. GANTZER 2,596,813
MATERIAL INSERTING MACHINE
Filed April 9, 1947 6 Sheets-Sheet 2
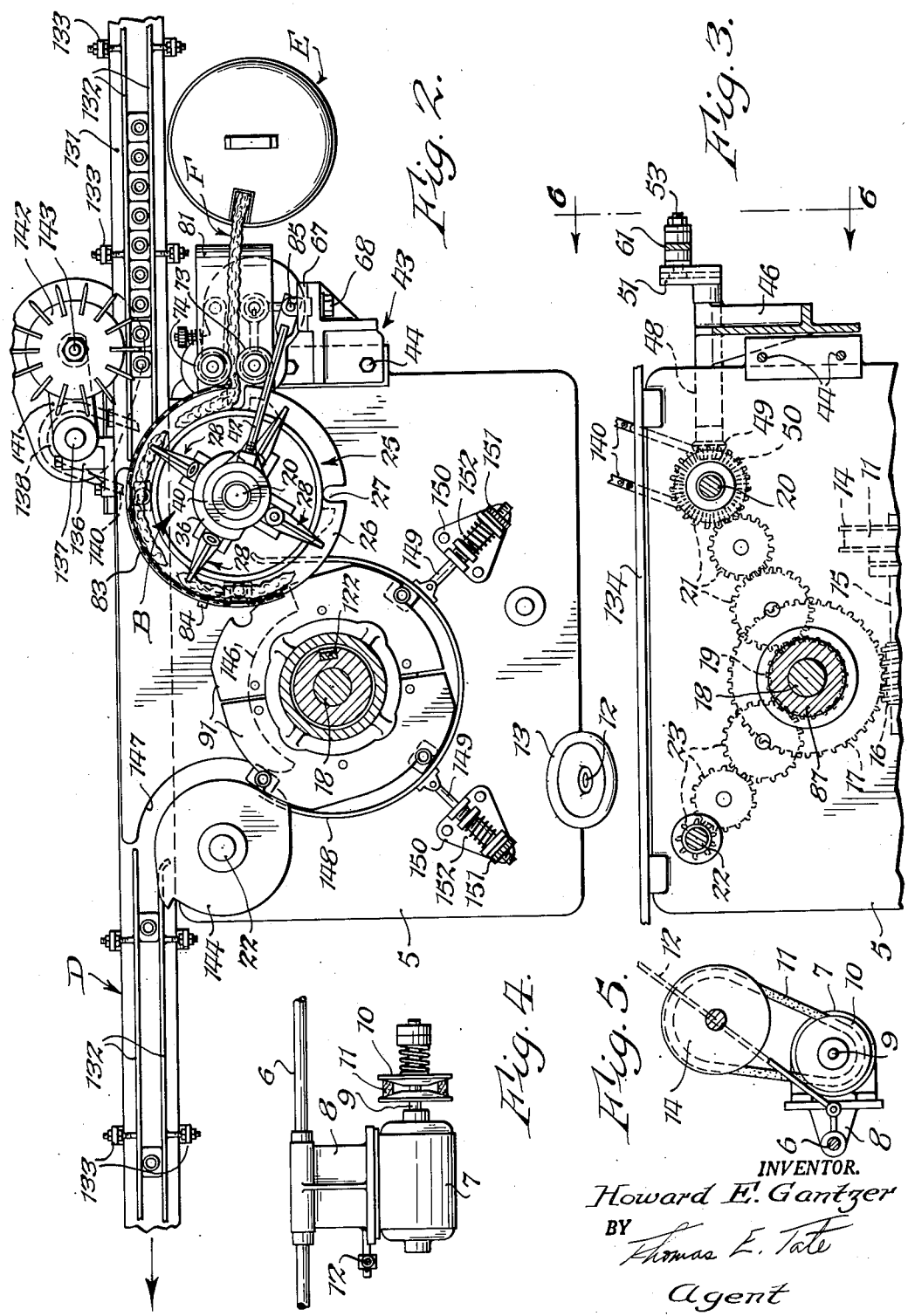
INVENTOR.
Howard E. Gantzer
BY
Thomas E. Tate
Agent

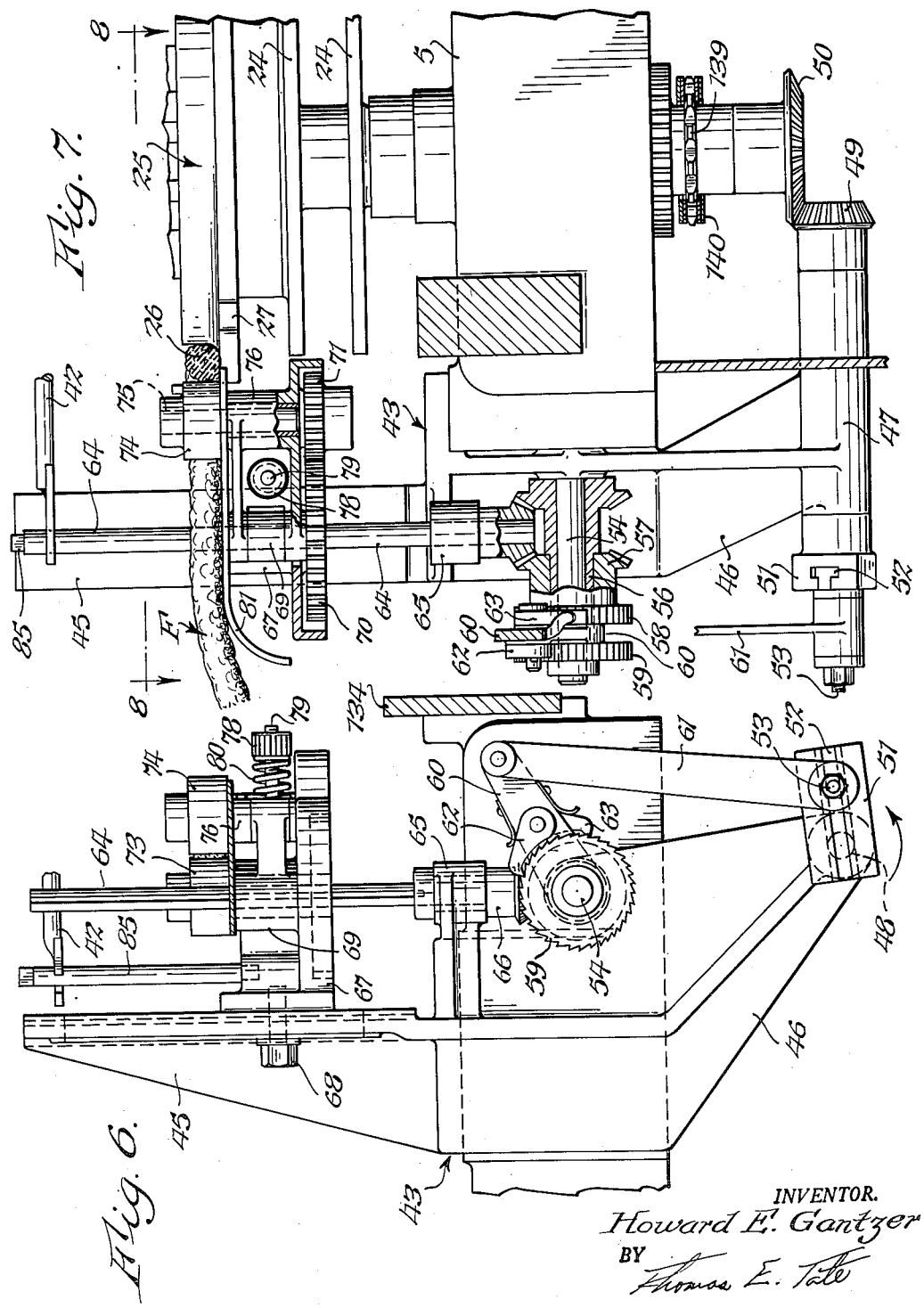

May 13, 1952 H. E. GANTZER 2,596,813
MATERIAL INSERTING MACHINE
Filed April 9, 1947 6 Sheets-Sheet 4
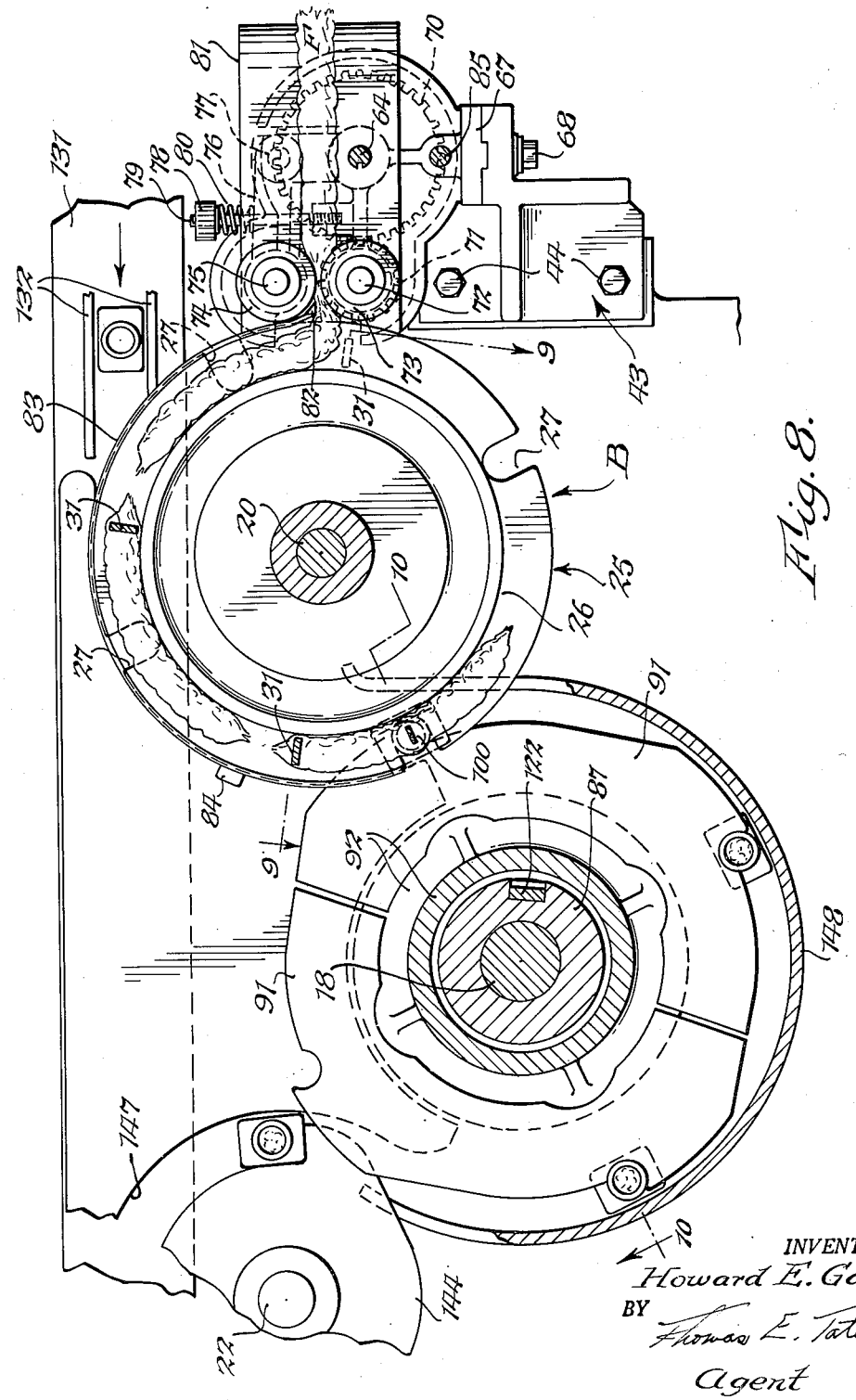
INVENTOR.
Howard E. Gantzer
BY
Thomas E. Tate
Agent May 13, 1952 — H. E. GANTZER — 2,596,813
MATERIAL INSERTING MACHINE
Filed April 9, 1947 — 6 Sheets-Sheet 5
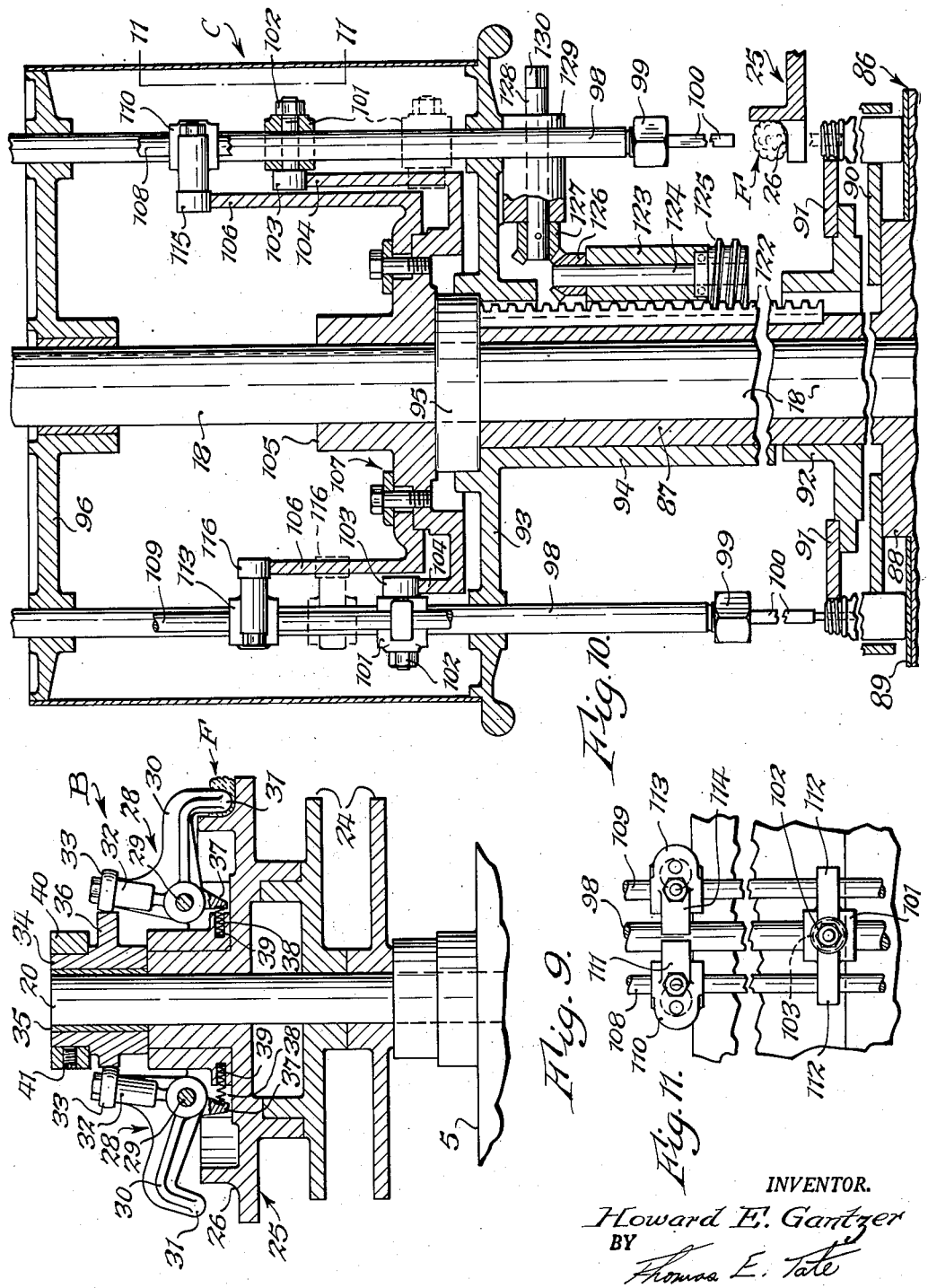
INVENTOR.
Howard E. Gantzer
BY Thomas E. Tate
Agent May 13, 1952     H. E. GANTZER     2,596,813
MATERIAL INSERTING MACHINE
Filed April 9, 1947     6 Sheets-Sheet 6
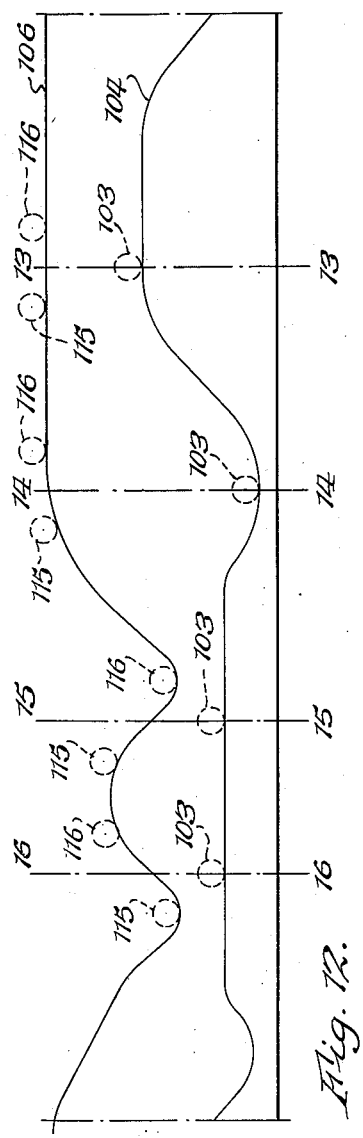
INVENTOR.
Howard E. Gantzer
BY Thomas E. Tate
Agent Patented May 13, 1952

2,596,813

UNITED STATES PATENT OFFICE 2,596,813

MATERIAL INSERTING MACHINE

Howard E. Gantzer, Kenmore, N. Y., assignor to Consolidated Packaging Machinery Corporation, Buffalo, N. Y., a corporation of New York Application April 9, 1947, Serial No. 740,391

9 Claims. (Cl. 226—19)

This invention relates to new and useful improvements in machines for inserting individual lengths of fibrous material into the necks of bottles, and particularly seeks to provide a novel machine of this general type which is adapted to perform the material-inserting operations as the bottles are moved continuously.

An object of this invention is to provide a machine for the insertion of fibrous materials into the necks of bottles in which individual lengths of the material are separated from a continuous strand without the necessity of employing a knife or edged severing apparatus.

Another object of this invention is to provide a machine of the character stated in which a length of fibrous material is inserted into the neck of each of a plurality of successively presented bottles while the bottles are being moved continuously by appropriate conveying devices.

Another object of this invention is to provide a machine of the character stated in which means are included for effecting lateral displacement of portions of the fibrous material from a position within the neck of a bottle to positions underlying the shoulders of a bottle.

Another object of this invention is to provide a machine of the character stated in which a vertically reciprocable primary tucking blade is employed to effect the initial insertion of a length of fibrous material into the neck of a bottle and a pair of alternately movable spring-biased tucking fingers are thereafter effective to cause the lateral displacement of portions of the fibrous material to positions underlying the shoulders of the bottle.

A further object of this invention is to provide a machine of the character stated which is so designed that its component work-performing elements may be readily exchanged or adjusted to adapt the machine for use in connection with bottles of varying sizes.

A further object of this invention is to provide a machine of the character stated in which the separating of an individual length of fibrous material from a continuous supply strand is effected by parting the individual portion from its supply strand through quickly applied tension.

A further object of this invention is to provide a machine of the character stated which has an operating capacity considerably in excess of any other known type of machine designed to perform similar operations.

A further object of this invention is to provide a fully automatic machine of the character stated which is simple in design, rugged in construction and economical to manufacture.

With these and other objects in view, the nature of which will become more apparent, the invention will be more fully understood by reference to the drawings, the accompanying detailed description and the appended claims.

In the drawings,

Fig. 2 is a horizontal section taken along line 2—2 of Fig. 1;

Fig. 3 is a somewhat fragmentary horizontal section of certain of those machine portions disclosed in Fig. 2, but particularly indicating the gear train for driving several of the moving parts;

Fig. 4 is a fragmentary top plan view of the motor mount;

Fig. 5 is an elevation of the motor mount indicated in Fig. 4;

Fig. 6 is a fragmentary end elevation taken in the direction indicated by the line 6—6 of Fig. 3;

Fig. 7 is a front elevation of the mechanism shown in Fig. 6;

Fig. 8 is an enlarged fragmentary top plan view of part of the mechanism shown in Fig. 2 but showing in greater detail the feeding and transfer means for the cotton strand;

Fig. 9 is a vertical section taken along line 9—9 of Fig. 8;

Fig. 10 is a vertical section taken along line 10—10 of Fig. 8;

Fig. 11 is an elevational view of the actuating rods for the tucker blade and fingers taken as indicated on line 11 of Fig. 10;

Fig. 12 is a development of the tucker blade and finger actuating cam;

Figs. 13, 14, 15 and 16 are enlarged serial detailed views illustrating one complete cycle of tucking an individual length of fibrous material into a bottle;

Fig. 17 is a perspective view of a tucking finger;

Fig. 18 is a perspective view of the tucking blade;

Fig. 19 is an enlarged detailed view of a tucking finger mounting means taken as indicated on line 19—19 of Fig. 15;

Fig. 20 is a detailed perspective view of a modified form of clamping arm; and

Fig. 21 is a fragmentary vertical section taken through the body portion of the clamp shown in Fig. 20.

Figure 1:
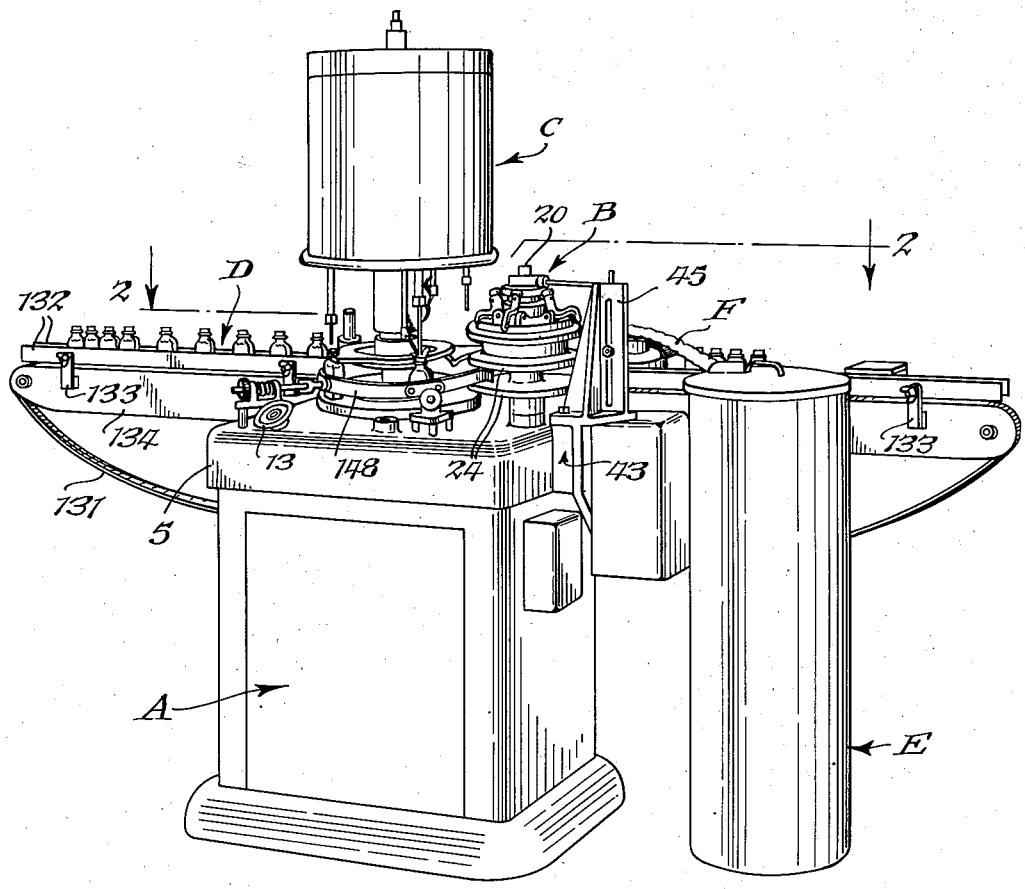
Fig. 1 is a rear perspective view of a machine constructed in accordance with this invention.

Referring to the drawings in detail, the invention as illustrated is embodied in a machine for inserting individual lengths of fibrous material strand into the necks of bottles and includes a base A, a fibrous material strand-separating and transfer mechanism generally indicated at B, a turret assembly generally indicated at C for performing the material-inserting operations, and an intake and discharge conveyor generally indicated at D. For the purposes of illustration a container E is indicated at the right of the machine as viewed in Fig. 1 and contains a continuous strand F of fibrous material such as cotton wadding.

The base A includes a skirted table top 5 which supports the major portion of all of the moving parts of the machine. A transverse rod 6 extends across the interior of the base A and pivotally supports a driving motor 7 through the medium of a bracket 8. The drive shaft 9 of the motor carries a self-adjusting V drive pulley 10 which is connected to the driven mechanisms of the machine through the medium of a V belt 11. Means including a rod 12 pivotally connected at its lower end to the motor bracket 8 and at its upper end to an adjusting hand wheel 13 are provided to maintain the motor in a stationary but adjustable position. It is believed apparent that as the motor bracket 8 is swung up or down through the medium of the adjusting hand wheel 13 and the supporting rod 12 the tension on the V belt 11 will be varied and will cause a corresponding variation in the effective diameter of the self-adjusting pulley 10 to effect speed variations in the driven mechanism. The V belt 11 is engaged at its upper end in a pulley 14 rigidly affixed to a transverse shaft indicated at 15 (see Fig. 3) journalled in suitable bearings secured to the underside of the table top 5. The shaft 15 carries a worm 16 which operatively meshes with a worm gear 17 to rotate the turret assembly C, as will be hereinafter more fully described.

It will be noted that the worm gear 17 is located generally centrally of the table top 5 and is journalled on a vertically positioned main spindle 18 rigidly carried by the table top 5 through the medium of suitably positioned depending house or supporting devices. A gear 19 having an elongated hub extending through and slightly above the table top 5 is journalled on the main spindle 18 and overlies the worm gear 17 and is rigidly connected to and rotates with the worm gear 17.

A vertically disposed shaft 20 is journalled in the table top 5 and is operatively connected to the gear 19 as by a train of gears 21. The ratio between the several gears 21 is such that the speed of rotation of the shaft 20 is equal to that of the gear 19. The shaft 20 is operatively connected to the fibrous strand separating and transfer mechanism B in a manner more fully to be described hereinafter.

A vertically disposed shaft 22 is journalled in the table top 5 and is operatively connected to the gear 19 as through a plurality of gears 23. The ratios between the several gears 23 are such that the speed of rotation of the shaft 22 will be double that of the gear 19.

In the fibrous strand separating and transfer mechanism B there are provided a pair of upper and lower star wheels 24, 24 which are rigidly affixed to the shaft 20. Each of the star wheels 24 is provided with four bottle-receiving pockets in order that individual bottles may be moved through an arcuate path from the intake section of the conveyer D to an operative association with the turret C. A transfer wheel generally indicated at 25 is also rigidly affixed to the shaft 20 and overlies the star wheels 24. The upper peripheral edge portion of the wheel 25 is provided with a generally arcuate shoulder 26 which provides a ledge upon which individual lengths of the cotton wadding may be carried. The transfer wheel 25 is provided with four peripherally located, radially extending notches corresponding to the pockets in the underlying star wheels 24. The transfer wheel 25 carries four clamp arms generally indicated at 28, each of which is pivotally connected to the transfer wheel as through the use of pivot shafts or studs 29 and includes a radially extending arm portion 30 terminating in a relatively thin, downwardly projecting clamp finger 31. Each clamp 28 is also provided with an upwardly projecting arm 32 provided at its outer end with a roller cam follower 33.

A sleeve 34 overlies the transfer wheel 25 and is journalled on the shaft 20 as through the medium of a bushing 35. The sleeve 34 carries a cylinder cam 36 which is engaged by the cam followers 33 of the clamps 28 in order to impart oscillating movement thereto about the axis of the pivot shaft 29 thereof. In order that the cam followers 33 may be maintained in constant operative engagement with the cam 36 the under portion of each clamp arm 28 is provided with a depending lug 37 against which a compression spring 38, positioned within a recess 39 in the hub of the wheel 25, exerts constant pressure, thus always tending to cause each of the clamps 28 to rotate about its pivot shaft 29 in a direction such as to maintain contact between the cam follower 33 and the cam 36.

The sleeve 34 and its associated cam 36 are prevented from rotating with the shaft 20 through the medium of a collar 40 which is rigidly secured thereto as by a set screw 41 and which is provided with a laterally extending arm 42 (see Fig. 2), the free end of which is affixed to another machine element, as will be more fully described hereinafter.

The continuous strip F of cotton wadding is adapted to be withdrawn from the container E through the medium of feeding devices carried by the table top 5 and operatively connected to the driving elements within the base A. These devices include a bracket generally indicated at 43 which is rigidly secured to the table top 5 as by suitably positioned bolts 44, 44 and includes an upwardly extending post 45 to which the feed roll mounting plate is adjustably secured and a depending portion 46 terminating in a laterally extending bearing boss 47. A shaft 48 is journalled in the bearing boss 47 and is provided on one end with a bevel gear 49 which meshes with a bevel gear 50 rigidly affixed to the lower end of the vertical shaft 20. Thus the shaft 48 is obviously driven from the shaft 20 through the above described gear connections. The other end of the shaft 48 is provided with a crank arm 51 having a groove 52 formed therein in which is adjustably mounted a crank pin 53.

A horizontally projecting shaft 54 is journalled in the central portion of the mounting bracket 43 and extends outwardly therefrom. The shaft 54 supports the requisite gearing for imparting a step by step feed movement to the strand F of cotton wadding. These feeding connections include a set of differential gears operatively connected with the crank pin 53 of the crank arm 51 and include a bevel gear 55 rigidly affixed to the shaft 54 and having an elongated hub 56 of reduced diameter. A second bevel gear 57 is journalled on the elongated hub 56 of the gear 55 and is provided at its outer end with a ratchet wheel 58 rigidly affixed thereto. A similar ratchet wheel 59 is secured to the outer end of the shaft 54 and is disposed in spaced relation with respect to the ratchet wheel 58. It may be noted that the teeth of the ratchet wheels 58 and 59 extend in opposite directions. A rock arm 60 is journalled at its inner end on that portion of the shaft 54 which lies between the ratchet wheels 58 and 59 and is pivotally connected at its outer end to the upper end of a link 61, the lower end of which is pivotally connected to the crank pin 53 of the crank arm 51. An upwardly extending spring-biased pawl 62 is pivotally connected to the rock arm 60 on one side thereof and is engageable with the ratchet wheel 59. A similar but downwardly extending spring-biased pawl 63 is pivotally connected to the other side of the rock arm 60 and engages the ratchet wheel 58.

The mounting bracket 43 rotatably carries a vertically extending shaft 64 journalled in a boss 65. The lower end of the shaft 64 is provided with a bevel gear 66 which meshes with the bevel gears 55 and 57 so that upon rotation of the shaft 43 and its associated crank arm and pin the rock arm 60 will be oscillated up and down and the ratchet wheels 58 and 59 will be given intermittent step by step movements of rotation alternately in opposite directions and the associated bevel gears will partake of similar step by step rotary movement to impart a step by step but more nearly continuous movement of rotation to the shaft 64 in a single direction.

A horizontally extending feed roll mounting bracket 67 is adjustably secured to the upstanding post portion 45 of the bracket 43 as through the medium of a clamping bolt 68. The bracket 67 is provided with an upstanding bearing boss 69 through which the shaft 64 extends. A gear 70 is rigidly but adjustably affixed to the shaft 64 in a position immediately underlying the bracket 67 and meshes with a somewhat smaller gear 71 rigidly affixed to the lower end of a vertically extending feed roll drive shaft 72 journalled in another portion of the bracket 67. The upper end of the feed roll shaft 72 carries a feed roll 73 rigidly affixed thereto. A second feed roll 74 is rigidly affixed to a vertically disposed idler shaft 75 journalled in the outer end of an arm 76 the other end of which is pivotally connected to the bracket 67 as at 77 (see Fig. 8 of the drawings). The arm 76 is constantly biased so that its associated feed roll always tends to contact the feed roll 73 through the medium of a knurled adjusting knob 78 threadably engaged on a stud 79 affixed to the bracket 67 and projecting outwardly through a suitable aperture provided in the arm 76. A compression spring 80 is carried by the stud 79 and is interposed between the knurled knob 78 and the associated face of the arm 76. It will be apparent that when the knob 78 is suitably tightened upon the studs 79 the spring 80 will exert a force against the arm 76 and urge its feed roller 74 towards the contact or feeding relation with respect to the driven feed roller 73. Thus the step by step movement of rotation derived by the shaft 64 through the bevel gear ratchet and crank arm connections as hereinbefore described is transmitted to the feed roll 73 through the gear connections 70 and 71 to impart a step by step feed producing movement to the feed roll 73. It is apparent that whenever a strand of cotton wadding is positioned in the nip between the driven feed roll 73 and the idler feed roller 74 this step by step movement as hereinbefore described will impart a linear forward motion to the strand of cotton.

In order to properly support the strand F of cotton wadding as it is fed between the feed rollers 73 and 74 a plate 81 is carried by the bracket 67 and has its upper face lying in a plane immediately below the lower faces of the feed rolls. The plate 81 is provided at its outer end with a downturned portion in order that the strand F of cotton wadding may be more easily pulled thereover and is suitably apertured so that the several shafts of the feeding devices may pass therethrough.

An upstanding stud 82 (see Fig. 8 of the drawings) is rigidly carried by the bracket 67 and is located just beyond the nip of the feed rolls 73 and 74. The upper portion of the stud 82 is preferably of triangular cross section in order that it may serve as a snubbing post for the parting or separating of an individual piece of cotton wadding from the continuous strand F in a manner to be hereinafter more fully described.

When the strand F of cotton wadding is fed by the feed rolls 73 and 74 the leading portion thereof is projected into engagement with the peripheral shoulder 26 of the transfer wheel 25. It may be found desirable to provide guide means to assist each individual length of cotton wadding to be retained in its position on the transfer wheel. These guide means may conveniently comprise an arcuate rail 83 concentrically disposed with regard to the shaft 20 carrying the transfer wheel 25 and having one end secured to the snubbing post 82 and its other end conveniently supported in any suitable manner upon the base of the machine, as indicated at 84 in the drawings.

The bracket 67 is also provided with an upstanding post 85 which is adapted to be engaged by the bifurcated end of the collar movement-restraining arm 42.

As the strand of cotton wadding F is fed by the feed rolls 73 and 74 the leading end of the strand becomes projected onto the shoulder of the transfer wheel 25 and, as viewed in Fig. 8 of the drawings, substantially enough of the strand has been fed to constitute an individual length of material for insertion into the neck of a bottle. As the transfer wheel is rotated the lower end 31 of the associated clamping arm (indicated in dotted lines) is moved downwardly into clamping relation onto the strand F of cotton wadding and continued rotation of the transfer wheel will cause the strand of cotton wadding to be drawn angularly across the snubbing post 82. Inasmuch as the feeding movement imparted by the said rolls 73 and 74 is of an intermittent nature and the movement of rotation of the transfer wheel 25 is constant, once a clamp 31 has become engaged with a newly fed portion of cotton wadding the next dwell of the feed rolls 73 and 74 will cause a movement of separation of the strand F of cotton wadding and will actually break off or part an individual length of wadding from the continuous strand. After a length has been separated or parted from the continuous strand in this manner the continued rotation of the transfer wheel 25 moves the individual length to a position in registry with the tucking devices carried by the turret assembly C where the clamp arm 31 is released from its clamping engagement with the individual length of cotton wadding, and tucking blades become effective to move the wadding downwardly through its associated notch 27 into the neck of a bottle carried in registry therewith.

The turret assembly C' includes a turret wheel or plate 86 journalled on the main spindle 18 and removably affixed to the upper end of the upstanding hub portion of the driving gear 19. The turret wheel 86 is provided with an upstanding elongated hub or sleeve 87 terminating at its lower end in a shoulder portion 88 providing a peripheral ledge 89 for the support of containers into which the individual pieces of the cotton wadding are to be inserted. An annular plate-type star wheel 90 having four peripheral pockets is rigidly affixed to the shoulder portion 88 of the turret wheel and the pockets thereof are shaped to conform to the bodily configuration of the containers or bottles upon which the work functions are to be performed. A second star wheel 91 having four pockets in registry with the pockets of the star wheel 90 is rigidly affixed to a mounting sleeve 92 which is in turn removably secured to the upstanding sleeve portion 87 of the turret wheel. The pockets of the upper star wheel 91 are shaped to conform to the neck portions of the bottles and the star wheel is disposed in spaced relation with respect to the star wheel 90.

A lower spindle plate 93 provided with a depending sleeve 94 is slidably carried by the upstanding sleeve portion 87 of the turret wheel and is prevented from angular movement with respect thereto through the medium of suitable slideway and key connections. The central portion of the upper face of the spindle plate 93 is counterbored to provide a recess into which a thrust bearing 95 mounted on the main spindle 18 is set. An upper spindle plate 96 is journalled on the main spindle 18 and maintained in spaced relation with respect to the lower spindle plate 93 as by suitable stay bolts (not shown) and a cylindrical casing 97 formed from sheet metal or the like. It will be appreciated that the turret wheel 86, the star wheels 90 and 91, and the upper and lower spindle plates 96 and 93 all rotate as a unit under the influence of the driven gear 19.

Mechanisms are carried between the upper and lower spindle plates 96 and 93 for first effecting an initial tucking of an individual length of cotton wadding into the neck of a bottle and then effecting a lateral displacement of portions of the cotton to positions underlying the shoulders of the bottle into which the cotton has been inserted. To this end the turret assembly is provided with four sets of mechanism (corresponding to the number of pockets of the star wheels 90 and 91) which are identical in structure. Accordingly, for convenience herein a detailed description will be made of only one of these assemblies and it will be appreciated that the remainder are alike.

A vertically reciprocable plunger or rod 98 is supported in suitable bearings in the upper and lower spindle plates 96 and 93 and is provided at its lower end with clamping means 99 for releasably holding a tucking blade 100. The upper end of the plunger or rod 98 projects sufficiently far above the plane of the upper spindle plate 96 that it cannot become accidentally disengaged from support therein. The central portion of the rod 98 is provided with an adjustably positioned casting 101 slidably carried thereon and releasably secured as through the use of a clamping bolt 102. The inner face of the casting 101 is provided with a roller cam follower 103 which is adapted to engage a cylinder cam 104 secured on the main spindle 18 as by an elongated hub portion 105 and restrained against relative angular movement with respect thereto as through suitable key and slideway connections and/or by set screws. The cam 104 in turn carries a second cylinder cam 106 secured thereto as through clamp plates and bolt connections indicated at 107.

The cylinder cam 106 is adapted to cause the reciprocation of a pair of spaced parallel rods 108 and 109, respectively, which are movably carried by the spaced upper and lower spindle plates 96 and 93 in a manner similar to the rod 98. Each rod 108 is provided with a casting 110 having a lateral projection 111 grooved to slidably engage the rod 98 in order that relative angular rotation of the rod 108 cannot take place, but at the same time permitting vertical reciprocatory motion. The casting 101 carried by the rod 98 is provided with a pair of oppositely extending lugs 112 through which the rods 108 and 109 extend. The rod 109 is provided with a casting 113 similar to the casting 110 on the rod 108 but symmetrically disposed in opposition thereto, and it is provided with a lateral lug extension 114 arcuately grooved to slidably engage the rod 98. The casting 113 similarly functions to prevent angular rotation of the rod 109 while at the same time permitting vertically reciprocatory motion thereto. The casting 110 carried by the rod 108 is provided with an inwardly extending roller cam follower 115 adapted to engage the cylinder cam 106. The casting 113 carried by the rod 109 is similarly provided with an inwardly extending roller cam follower 116 also engageable with the cylinder cam 106.

The lower end of the rod 108 is provided with pivotally connected means 117 for releasably clamping a tucking finger 118. The clamp 117 is provided with a laterally projecting lug 119, the outer end of which is yieldably connected to the rod 108 as by a tension spring 120 in order constantly to bias the tucking finger 118 towards the right, as viewed in Figs. 15 and 16 of the drawings.

The lower end of the rod 109 is provided with similar clamping means 121 carrying another tucking finger 118. It will be noted that in connection with the rod 109 the tucking finger is always biased to the left, as viewed in Figs. 15 and 16 of the drawings.

The lower end of each tucking finger 118 may be shaped as indicated in Fig. 17 of the drawings in order that the serrated ends thereof may be properly directed into the shoulders of a bottle as viewed in Figs. 15 and 16 without contacting or exerting any leverage on the neck portion of the bottle.

The upper and lower spindle plates 96 and 93 together with their associated mechanisms are vertically adjustable along the main spindle 18 with respect to the turret wheel 86 in order that the machine may be usable in connection with successive runs of bottles of different heights. To this end one side of the elongated hub 87 of the turret wheel 86 is provided with a longitudinal groove into which is firmly affixed a rack 122. That portion of the depending sleeve 94 of the lower spindle plate 93 which is in proximity to the rack 122 is provided with an offset lug portion 123 into which is journalled a vertically disposed shaft 124 provided on its lower end with a worm 125 engageable with the rack 122 and provided on its upper end with a bevel gear 126. The bevel gear 126 meshes with a bevel gear 127 carried on a horizontally disposed shaft 128 journalled in a lug 129 depending from the lower spindle plate 93. The outer end of the shaft 128 is squared as at 130 to provide a surface which can be engaged by a wrench or by a suitably proportioned hand wheel to effect rotation thereof. Rotation of the shaft 128 will cause a similar movement of rotation of the shaft 124 and its associated worm 125 to effect relative longitudinal sliding movement between the hub 87 of the turret wheel and the depending sleeve 94 of the spindle plate assembly to vary the vertical distance between the turret wheel and the spindle plate assembly. Prior to any actual vertical adjustment in this manner it will be necessary to release any set screws which may be employed in the hub 105 of the cylinder cam 104 in order that the thrust bearing 95 together with the cylinder cam assembly may be slidably pushed along the main spindle 18 when the vertical adjustment is made. After the change in adjustment of vertical height has been effected it is, of course, obvious that any set screws which may be employed on the hub 105 of the cylinder cam will again be tightened.

Whenever containers of different heights are to be operated upon by the machine constructed in accordance with this invention there are frequently changes in the other dimensions of such containers which necessitate the replacement of the annular plate star wheels 90 and 91 in order that the container-receiving pockets thereof may properly conform to the configurations of the new containers. In order that this may be conveniently effected it may be found preferable to construct each of the annular plate star wheels 90 and 91 from a plurality of segments which are removably fastened to the associated portions of the mechanism so that it will be unnecessary to completely disassemble the entire turret assembly C whenever changes in bottle formations are encountered.

Bottles or containers into which individual lengths of cotton wadding are to be inserted are fed into and discharged from the machine constructed in accordance with this invention through the conveyor D which is a straight-line conveyer extending across the front of the machine and essentially comprises a conveyer belt or chain 131 carried upon suitable pulleys or sprocket wheels (not shown) and driven through the medium of suitable power connections such as by a power take-off (not shown) from the vertical shaft 22 journalled in the table top 5. A pair of spaced guide rails 132, 132 is adjustably supported in a position overlying the conveyer belt 131 as through the medium of a plurality of supporting lugs 133 which are in turn carried by a vertically disposed, horizontally extending main conveyer-mounting plate 134 (see Figs. 1, 2 and 3 of the drawings).

Container feed control means generally indicated at 135 are associated with the intake portion of the conveyer D in a position immediately ahead of the transfer assembly B. The feed control mechanism comprises a mounting bracket 136 secured to a stationary part of the conveyer D in which is journalled a vertically disposed shaft 137 carrying on its lower end a sprocket gear 138 which is operatively connected to a similar sprocket gear 139 secured to the depending portion of the vertical shaft 20 of the table top 5 as by a sprocket chain 140. An arm 141 is pivotally carried by the shaft 137 and rotatably supports a multiple pocket star wheel 142 on a shaft 143 which is driven from the shaft 137 through suitable sprocket chain and gear connections (not shown). It will be appreciated that the linear speed of advance of the conveyer belt 131 and the rotative speed of the star wheel 142 are so regulated with respect to the speed of rotation of the transfer wheel 25 that each container which is released from a pocket of the star wheel 142 will be received into a pocket of the spaced star wheels 24 of the transfer mechanism in properly timed relation. After each bottle has passed from the intake section of the conveyer D through the mechanism B and the turret mechanism C it is discharged from the star wheel pocket of the turret mechanism into engagement with a final two-pocket discharge wheel 144 secured to the upstanding portion of the shaft 22 projecting above the table top 5. It will be understood that the two-pocket star wheel 144 rotates twice for each revolution of the turret assembly C in order properly to remove bottles from each of the four pockets of the turret assembly star wheels.

In order that the bottles may be individually directed through their proper arcuate paths of travel from one machine portion to the other after they leave the entrance section of the conveyer D until they return to the discharge section of the conveyer suitable guide means are provided. To that end a plate 145 is secured in spaced relation above the table top 5 and overlies the mid portion of the conveyer and the adjacent part of the table top. One edge portion of the plate 145 is curved to conform with the radius of curvature of the transfer mechanism spaced star wheels 24. The central, inwardly projecting portion of the plate 145 underlies the segmental star wheel 91 of the turret assembly C and is arcuately configured as at 146 in order to clear the central portion of the turret assembly, and the opposite end portion of the plate 145 is curved as at 147 to conform with the general radius of curvature of the two-pocket discharge wheel 144. Thus the curved end portions of the plate 145 together with the associated movable elements of the machine define arcuate paths of travel or guideways within which the individual containers are directed. The turret assembly C is provided with arcuate guide means spaced around the segmental star wheels 90 and 91 thereof, and comprising an arcuate guide rail 148 carried by a pair of horizontally disposed, radially extending supporting studs 149, 149 adjustably supported on brackets 150 through the medium of adjusting knobs 151 threadably engaged on the outer ends of the studs 149 and yieldably biased against upstanding portions of the brackets 150 as by compression springs 152.

While the operation of a machine constructed in accordance with this invention should be readily apparent from the foregoing description it is believed that a clearer understanding of the invention may be had if one complete cycle of operation is described. A line of partially filled bottles into which individual pieces of cotton wadding are to be inserted is supplied to the intake end of the conveyer D. The leading bottle of the solid line is engaged within a pocket of the feed control star wheel 142 which effects a spacing of the leading bottle from the remainder and permits it to be fed in properly timed relation along the conveyer D until it abuts the leading arcuate edge portion of the guide plate 145 overlying the table top 5, at which time the container simultaneously becomes engaged by pockets of the spaced star wheels 24, 24 of the transfer mechanism B. As viewed in Fig. 4 of the drawings the transfer wheel 25 and its associated devices are rotated in a counterclockwise direction.

As the bottle is being fed to the transfer mechanism the shaft 48 and the crank arm 51 have been rotating to effect oscillatory movement of the rock arm 60 to feed a length of cotton wadding F between the feed rolls 73 and 74 onto the shouldered portion 26 of the transfer wheel in which substantially equal portions of the cotton wadding are disposed to either side of a radial notch 27 of the transfer wheel. At this stage a roller cam follower 33 of the clamp arms 28 becomes engaged with the outwardly bulging portion of the horizontal cam 36 which is maintained rigid with respect to the shaft 20 to thereby cause an outward oscillation of the clamp arm 28, the lower end 31 of which clamps the strand F of cotton wadding against the shoulder of the transfer wheel 25 (see Fig. 9 of the drawings). As the transfer wheel 25 continues to rotate the rock arm 60 reaches a period of dwell which causes topping of feeding of the strand of cotton wadding between the feed rolls 73 and 74 and causes that portion of the wadding lying between the feed rolls toward the transfer mechanism to be abruptly pulled across the triangularly cross-sectioned snubbing post 82 to thereby separate or part, purely by tension, an individual length of wadding from the continuous strand. By referring to Fig. 2 of the drawings it will be seen that a new length of wadding is being fed onto the transfer wheel 25 adjacent the right quadrant thereof and that two individual lengths of wadding are carried thereby, one at the upper quadrant thereof and the other at the left quadrant thereof.

Continued rotation of the transfer wheel 25 with its associated individual length of cotton wadding and container held in the pocket of the spaced star wheels 24 brings the container and associated wadding into the position indicated at the left end quadrant of the transfer wheel 25 as shown in Fig. 2 of the drawings. At this point the roller cam follower 33 of the clamp arm 28 is approaching a drop or recession on the horizontal cam 36 which will permit the compression spring 38 to rotate the clamp arm 28 about its pivot shaft 29 to release the individual length of cotton wadding from its clamped engagement in the shouldered portion 26 of the transfer wheel. Upon release of the individual length of wadding as described above the bottle and radial notch 27 of the transfer wheel have been brought into substantial vertical registry with a tucking blade 100 of the turret assembly C and a composite pocket of the spaced star wheel 90 and 91 thereof is about to engage the bottle to remove it from the transfer mechanism to the control of the turret.

A complete cycle of the initial and lateral tucking operations which are performed by each set of tucking blades and fingers carried by the turret assembly C will be readily understood by reference to Figs. 12 through 16, inclusive, of the drawings. Fig. 12 is a development of the two cylinder cams 104 and 106 of the turret assembly with the roller cam followers 103, 115 and 116 of the associated rods indicated thereon in dotted line positions through several stages of one complete cycle of operations. Figs. 13 through 16 illustrate the actual positions of the tucking blade 100 and the tucking fingers 118 as they appear in positions comparable to those indicated by the lines 13—13 through 16—16 of Fig. 12. It will be seen that when the roller cam followers are in the positions indicated adjacent the line 13—13 of Fig. 12 the tucking blade 100 is about to move downwardly towards the transfer wheel 25 to move an individual length of cotton wadding F carried thereon down through the radial notch 27 thereof into the upstanding neck portion of an associated bottle. As shown in Fig. 14 (see also line 14—14 of Fig. 12) the rod 98 and its associated tucking blade 100 have effected the initial insertion of a length of cotton wadding into the neck of a bottle and the lefthand tucking finger as viewed in Fig. 14 is commencing its downward movement as its cam follower 115 starts to traverse a descending portion of the cylinder cam 106. Since the tucking fingers 118 are spring-biased with respect to their mounting rods 108 and 109, respectively, they will always tend to contact the tucking blade 100 and will enter the neck of the bottle near the central portion thereof. Between the lines 14—14 and 15—15 of Fig. 12 the tucking blade 100 has been retracted from its lowermost position of downward movement to a position slightly above the top of the neck portion of the bottle and the lefthand tucking finger 118 has completed one downward movement into the neck portion of the bottle and effected a lateral displacement of a portion of the cotton wadding under the righthand shoulder portion of the bottle and has become retracted from its wadding-engaging position within the bottle. As the lefthand finger 118 becomes retracted from the bottle the opposite or righthand finger 118 enters the bottle as its mounting rod 109 moves downwardly under the control of its roller cam follower 116 riding on the cylinder cam 106 to effect a leftward lateral displacement of the wadding to a position underlying the lefthand shoulder portion of the bottle as viewed in Fig. 15. A final lateral tucking operation is performed as the parts reach the positions indicated by Fig. 16 of the drawings (see also line 16—16 of Fig. 12) in which the lefthand tucking finger 118 under the influence of the downward movement of its mounting rod 108 performs a second rightwardly directed tucking operation to completely move the remaining portion of the cotton wadding to a position lying entirely within the neck portion of the bottle. The righthand finger 118 thereafter performs a second leftwardly directed tucking operation to properly compact portions of the cotton more firmly under the left shoulder of the bottle. Following a completion of the lateral tucking operations by the fingers 118 the roller cam follower 103 of the rod 98 reaches a slight dip in the contour of the cylinder cam 104 as shown at the extreme lefthand end of Fig. 12 of the drawings to effect a final slight downward movement of the tucking blade 100 to complete the final topping off or compacting of the cotton wadding within the neck of the bottle. After this final compacting is completed the tucking blade 100 together with the rods 108 and 109 carrying the tucking fingers 118 are returned to their initial starting positions.

In Figs. 20 and 21 of the drawings there is illustrated a modified form of clamping arm for use in connection with the transfer mechanism which is constructed to permit relief in the event that an oversized piece of wadding should be held between the outer end of the clamp arm and the associated portion of the transfer wheel 25. In this particular modification the clamping means includes an upstanding arm portion 153 carrying a roller cam follower 154 at its upper end and being provided at its lower end with a horizontally disposed bifurcated bearing boss 155. The arm 153 is adapted to receive one end of a clamp arm 156 between the bifurcations of the bearing boss 155, and a pivotal connection is retained therebetween as through the medium of a pivot pin 157. The outer end of the arm 156 terminates in a downwardly extending portion 158 engageable with a length of cotton wadding carried on the transfer wheel. The inner portion of the arm 156 is recessed to receive a relatively heavy compression spring 159, the outwardly projecting end of which is disposed in abutting relation with the corresponding portion of the upstanding arm 153. Opposite sides of the arm 156 are provided with a pair of oppositely directed lugs 160 adapted to engage a shoulder 161 carried on each bearing boss 155 and serve to limit the amount of pivotal movement that can take place between the arms 153 and 156 under the influence of the compression spring 159. It should be noted that the strength of the compression spring 159 should be great enough that there will be no relative pivotal movement between the arms 153 and 156 under normal clamping pressure in which an individual length of cotton wadding is held between the depending arm portion 158 and the associated shoulder portion of the transfer wheel 25 unless through accident there should be an unduly large or thick portion of cotton wadding placed into position for clamping on the transfer wheel which would normally cause overloading on the clamping arm and its associated cam follower and cam mechanisms.

Thus it will be seen that the invention herein disclosed provides a novel machine for the automatic insertion of individual lengths of cotton wadding into the necks of successively presented bottles while the bottles are moved continuously without interruption through work-performing portions of the machine; in which individual lengths of the cotton wadding are separated from a continuous strand thereof automatically without the use of any severing mechanism as such; in which means are provided for not only inserting a length of wadding into the neck of a bottle but for also effecting lateral displacement of portions of each length of wadding to positions underlying the shoulder portions of the bottle into which the cotton is inserted; in which the lateral displacement of portions of the wadding is effected in first one direction and then the opposite direction in order that manipulation of the wadding may be more easily facilitated; and which is simple in design and rugged in construction.

It is, of course, to be understood that various details of arrangements and proportions of parts may be modified within the scope of the appended claims.

I claim:

1. In a machine for inserting individual lengths of packing material into neck portions of containers, the combination of means including feed rolls and clamping devices for breaking off purely by tension individual lengths of packing material from a continuous strand thereof, with means for transferring said individual lengths of packing material from the position at which they are separated from said continuous strand to a position at which insertion into the neck portion of a container can be effected, the clamping devices of said breaking-off means being carried by said transferring means, means disposed in close association with said transfer means for successively removing the said individual lengths of packing therefrom and inserting the said individual lengths of packing into individually presented containers, and means for presenting individual containers successively to said inserting means.

2. In a machine for inserting individual lengths of fibrous material into the necks of bottles, a main frame, means supported on said main frame for feeding a continuous strand of fibrous material, a continuously rotating transfer wheel located adjacent said feeding means and adapted to support the free end of said strand after it leaves said feeding means, plural strand-clamping means carried by said transfer wheel, means for driving said feeding means to impart step by step near-continuous feeding movement to said strand whereby successive individual lengths of fibrous material will be broken therefrom and supported on said transfer wheel after successively presented free ends of said strand have become engaged by said clamping means and during periods of dwell between certain successive feeding steps imparted to said strand, a continuously rotating turret supported on said main frame and located adjacent said transfer wheel, means carried by said turret for effecting the removal of the individual lengths from said transfer wheel and the insertion thereof into the necks of successively presented bottles, means for releasing each said clamping means prior to removal of its clamped individual strand length from said transfer wheel, means for successively presenting a series of bottles to said turret in properly timed relation, and continuously operating means for withdrawing successively packed bottles from said turret.

3. In a machine for inserting individual lengths of fibrous material into the necks of shouldered bottles, a main frame, means supported on said main frame for feeding a continuous strand of fibrous material, a continuously rotating transfer wheel located adjacent said feeding means and adapted to support the free end of said strand after it leaves said feeding means, a plurality of strand clamping means carried by said transfer wheel, means for driving said feeding means to impart step by step near-continuous feeding movement to said strand whereby successive individual lengths of fibrous material will be broken therefrom and supported on said transfer wheel after successively presented free ends of said strand have become engaged by said clamping means and during periods of dwell between certain successive feeding steps imparted to said strand, a continuously rotating turret supported on said frame and located adjacent said transfer wheel, means carried by said turret for effecting the removal of the individual lengths from said transfer wheel and the insertion thereof into the necks of successively presented bottles, means for releasing each said clamping means prior to removal of its clamped individual strand length from said transfer wheel, means including spring-biased tucking fingers carried by said turret effective after insertion of an individual strand length into the neck of a bottle to alternately tuck portions of such strand under the shoulders of said bottle, means for successively presenting a series of bottles to said turret in properly timed relation to the strand-inserting and tucking means thereof, and continuously operating means for effecting the withdrawal of successively packed bottles from said turret.

4. In a machine for inserting individual lengths of fibrous material into the necks of shouldered bottles, a main frame, means supported on said main frame for intermittently feeding a continuous strand of fibrous material, a continuously rotating transfer wheel located adjacent said feeding means and being provided with a peripheral strand-supporting shoulder having a plurality of radially extending notches formed therein, plural strand-clamping means carried by said transfer wheel and disposed in positions intermediate said radially extending notches, said continuous strand of fibrous material being broken by tension successively into individual lengths supported on said peripheral shoulder by the continued movement of rotation of said transfer wheel during certain periods of dwell in the intermittent feeding of said continuous strand, a continuously rotating turret supported on said main frame and located adjacent said transfer wheel in overlapping relation with respect thereto, means carried by said turret for pushing each individual length of fibrous material downwardly through an associated radially extending notch into the necks of successively presented bottles, means for releasing each said clamping means prior to removal of its clamped individual strand length from said transfer wheel, means carried by said turret thereafter effective to tuck a portion of said individual strand length under one shoulder of said bottle, and additional means thereafter effective to tuck another portion of said individual strand length under the other shoulder of said bottle, said initially effective downwardly pushing means being finally effective to again move downwardly to tamp down the central portion of said individual strand length within the area of the neck portion of said bottle.

5. In a machine for inserting individual lengths of fibrous material into the necks of shouldered bottles, a main frame, means supported on said main frame for intermittently feeding a continuous strand of fibrous material, a continuously rotating transfer wheel located adjacent said feeding means and being provided with a peripheral strand-supporting shoulder having a plurality of radially extending notches formed therein, plural strand-clamping means carried by said transfer wheel and disposed in positions intermediate said radially extending notches, said continuous strand of fibrous material being broken by tension successively into individual lengths supported on said peripheral shoulder by the continued movement of rotation of said transfer wheel during certain periods of dwell in the intermittent feeding of said continuous strand, a continuously rotating turret supported on said main frame and located adjacent said transfer wheel in overlapping relation with respect thereto, means carried by said turret for pushing each individual length of fibrous material downwardly through an associated radially extending notch into the necks of successively presented bottles, means for releasing each said clamping means prior to removal of its clamped individual strand length from said transfer wheel, means carried by said turret thereafter effective to tuck a portion of said individual strand length under one shoulder of said bottle, additional means thereafter effective to tuck another portion of said individual strand length under the other shoulder of said bottle, said initially effective downwardly pushing means being finally effective to again move downwardly to tamp down the central portion of said individual strand length within the area of the neck portion of said bottle, and means for successively presenting a series of continuously moving bottles to said turret in properly timed relation to the strand-inserting and tucking means thereof.

6. In a machine for inserting individual lengths of fibrous material into the necks of shouldered bottles, a main frame, means supported on said main frame for intermittently feeding a continuous strand of fibrous material, a continuously rotating transfer wheel located adjacent said feeding means and being provided with a peripheral strand-supporting shoulder having a plurality of radially extending notches formed therein, plural strand-clamping means carried by said transfer wheel and disposed in positions intermediate said radially extending notches, said continuous strand of fibrous material being broken by tension successively into individual lengths supported on said peripheral shoulder by the continued movement of rotation of said transfer wheel during certain periods of dwell in the intermittent feeding of said continuous strand, a continuously rotating turret supported on said main frame and located adjacent said transfer wheel in overlapping relation with respect thereto, means carried by said turret for pushing each individual length of fibrous material downwardly through an associated radially extending notch into the necks of successively presented bottles, means for releasing each said clamping means prior to removal of its clamped individual strand length from said transfer wheel, means carried by said turret thereafter effective to tuck a portion of said individual strand length under one shoulder of said bottle, additional means thereafter effective to tuck another portion of said individual strand length under the other shoulder of said bottle, said initially effective downwardly pushing means being finally effective to again move downwardly to tamp down the central portion of said individual strand length within the area of the neck portion of said bottle, means for successively presenting a series of continuously moving bottles to said turret in properly timed relation to the strand-inserting and tucking means thereof, and continuously operating means for effecting the withdrawal of successively packed bottles from said turret.

7. In a machine of the character described, means for supplying a length of fibrous material, a tucking blade for inserting the said individual length of fibrous material into the neck of a shouldered bottle, a tucking finger thereafter effective to tuck a portion of said fibrous material under one shoulder of the bottle, another tucking finger effective after said first mentioned tucking finger to tuck another portion of said fibrous material under the opposite shoulder of said bottle, and means for sequentially imparting tucking motions to said tucking blade and to each of said tucking fingers.

8. In a machine of the character described, means for continuously moving a series of partly filled shouldered bottles, means for supplying successively a series of individual lengths of fibrous material for insertion into the necks of said bottles, means for effecting the insertion of each of said individual lengths into the neck of an associated bottle and comprising a tucking blade for effecting the initial insertion, a tucking finger thereafter effective to tuck a portion of said fibrous material under one shoulder of the bottle, and another tucking finger thereafter effective to tuck another portion of said fibrous material under the opposite shoulder of said bottle, and means for bodily moving said inserting and tucking means in synchronization with said continuously moving bottles whereby the said individual lengths of fibrous material will be inserted into the necks of said bottles while said bottles are continuously moving.

9. In a machine for inserting individual lengths of fibrous material into the necks of bottles, a main frame, means supported on said main frame for feeding a continuous strand of fibrous material, a continuously rotating transfer wheel located adjacent said feeding means and adapted to support the free end of said strand after it leaves said feeding means, strand-clamping means carried by said transfer wheel, the feeding movement of said feeding means being interrupted at periodic intervals whereby successive individual lengths of fibrous material will be broken therefrom and supported on said transfer after successively presented free ends of said strand have become engaged by said clamping means and during the interrupted intervals of said feeding means, a continuously rotating turret supported on said main frame and located adjacent said transfer wheel, means carried by said turret for effecting the removal of the individual lengths from said transfer wheel and the insertion thereof into the necks of successively presented bottles, means for releasing said clamping means prior to removal of its clamped individual strand length from said transfer wheel, means for successively presenting a series of bottles to said turret in properly timed relation, and continuously operating means for withdrawing successively packed bottles from said turret.

HOWARD E. GANTZER.

REFERENCES CITED

The following references are of record in the file of this patent:

UNITED STATES PATENTS

| Number | Name | Date |
|---|---|---|
| 1,425,059 | Schliefer | Aug. 8, 1922 |
| 2,171,572 | Kelly | Sept. 5, 1939 |
| 2,269,722 | Lakso | Jan. 13, 1942 |
| 2,304,932 | Lakso | Dec. 15, 1942 |
| 2,328,582 | Ratchford | Sept. 7, 1943 |
| 2,412,089 | Kelly | Dec. 3, 1946 |
| 2,501,770 | Gantzer | Mar. 28, 1950 |

FOREIGN PATENTS

| Number | Country | Date |
|---|---|---|
| 334,107 | Great Britain | Aug. 28, 1930 |